US012420220B2

(12) United States Patent
Arensmeier et al.

(10) Patent No.: US 12,420,220 B2
(45) Date of Patent: Sep. 23, 2025

(54) VALVES FOR FILTER DRIERS AND BI-FLOW FILTER DRIERS INCLUDING THE SAME

(71) Applicant: Emerson Electric Co., St. Louis, MO (US)

(72) Inventors: Jeffrey N. Arensmeier, Fenton, MO (US); Christopher J. Schroeder, St. Charles, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 563 days.

(21) Appl. No.: 17/952,660

(22) Filed: Sep. 26, 2022

(65) Prior Publication Data
US 2024/0100454 A1 Mar. 28, 2024

(51) Int. Cl.
| *B01D 35/15* | (2006.01) |
| *B01D 35/157* | (2006.01) |
| *F25B 13/00* | (2006.01) |
| *F25B 41/20* | (2021.01) |
| *F25B 43/00* | (2006.01) |

(52) U.S. Cl.
CPC ......... *B01D 35/15* (2013.01); *B01D 35/1573* (2013.01); *F25B 13/00* (2013.01); *F25B 41/20* (2021.01); *F25B 43/003* (2013.01)

(58) Field of Classification Search
CPC ..... B01D 35/15; B01D 35/1573; F25B 13/00; F25B 43/003
See application file for complete search history.

(56) References Cited

U.S. PATENT DOCUMENTS

| 3,178,022 A | 4/1965 | Balogh |
| 3,289,841 A | 12/1966 | Quinting |
| 3,799,347 A | 3/1974 | McDuffie |
| 4,029,580 A | 6/1977 | Lange |
| 4,125,469 A | 11/1978 | Henton et al. |
| 6,235,192 B1 | 5/2001 | Melfi et al. |

(Continued)

FOREIGN PATENT DOCUMENTS

JP 09-089419 4/1997

OTHER PUBLICATIONS

PCT International Search Report and Written Opinion for PCT/US2023/029317 that claims priority to the instant application; dated Nov. 15, 2023; 12 pages.

(Continued)

*Primary Examiner* — Bradley R Spies
(74) *Attorney, Agent, or Firm* — Harness, Dickey & Pierce, P.L.C.; Anthony G. Fussner

(57) ABSTRACT

In exemplary embodiments, a bi-directional valve for a bi-flow filter drier includes a valve body and a movable valve member disposed within the valve body. The movable valve member is movable within the valve body between a first position and a second position. In the first position, the movable valve member permits fluid flow in a first or forward flow direction through the valve while blocking or inhibiting fluid flow in a second or reverse flow direction through the valve. In the second position, the movable flow member permits fluid flow in the second or reverse flow direction through the valve while blocking or inhibiting fluid flow in the first or forward flow direction through the valve. The direction of fluid flow through the other filter drier components may be essentially the same whether the movable valve member is in the first position or the second position.

17 Claims, 7 Drawing Sheets

(56) References Cited

U.S. PATENT DOCUMENTS

2003/0140792 A1    7/2003   Pilgram et al.
2007/0102042 A1    5/2007   Thrash et al.
2012/0000550 A1    1/2012   Hunnicutt et al.
2020/0309428 A1   10/2020   Reeves et al.

OTHER PUBLICATIONS

Kimball; What is an AC Filter Drier & When Should it Be Replaced? www.TampaApplianceParts.com; Dec. 12, 2018; 6 pages.
Rao; What is a Spool Valve? PLC SCADA Courses—Engineers Community; Copyright 2022; 16 pages.
SRS DMB BFK 052 052 083 084 085 Liquid Line Bi-flow filter Drier with Solid Block, Sanrong; Heat Pump R410A Refrigerant Filter Drier; Alibab.com; Copyright 1999-2022; 4 pages.
Air Conditioning and Refrigeration Controls; Driers; Sporland Catch-All Lisquid Line Filter-Driers; accessed Sep. 9, 2022; 4 pages.
BFK Bi-flow Filter Drier; Alco Controls; www.climate-emerson.com/en-GB; Accessed Sep. 9, 2022; 4 pages.
Danfoss DMB 3/8" Bi-Flow Solder Filter; Accessed Sep. 9, 2022; 8 pages.
Filter Driers; airconditioning-systems.com; Copyright 2008-2022; 7 pages.

VALVES FOR FILTER DRIERS AND BI-FLOW FILTER DRIERS INCLUDING THE SAME

FIELD

The present disclosure generally relates to valves for filter driers and bi-flow filter driers including the same.

BACKGROUND

This section provides background information related to the present disclosure which is not necessarily prior art.

A bi-flow filter drier may be used in a reversible refrigeration system with bi-directional flow to remove or absorb moisture and acids and to filter out debris, impurities, and/or other contaminants from the refrigeration system. The bi-flow filter drier is operable for filtering contaminants from refrigerant in a first or forward flow direction through the bi-flow filter drier without reintroducing the filtered contaminants back into the refrigeration system when the refrigerant flows in a second or reverse flow direction through the bi-flow filter drier. Conversely, the bi-flow filter drier is also operable for filtering contaminants from the refrigerant in the second or reverse flow direction through the bi-flow filter drier without reintroducing the filtered contaminants back into the refrigeration system when the refrigerant flows in the first or forward flow direction through the bi-flow filter drier.

DRAWINGS

The drawings described herein are for illustrative purposes only of selected embodiments and not all possible implementations, and are not intended to limit the scope of the present disclosure.

Corresponding reference numerals may indicate corresponding (though not necessarily identical) features throughout the several views of the drawings.

DETAILED DESCRIPTION

Figure 1:
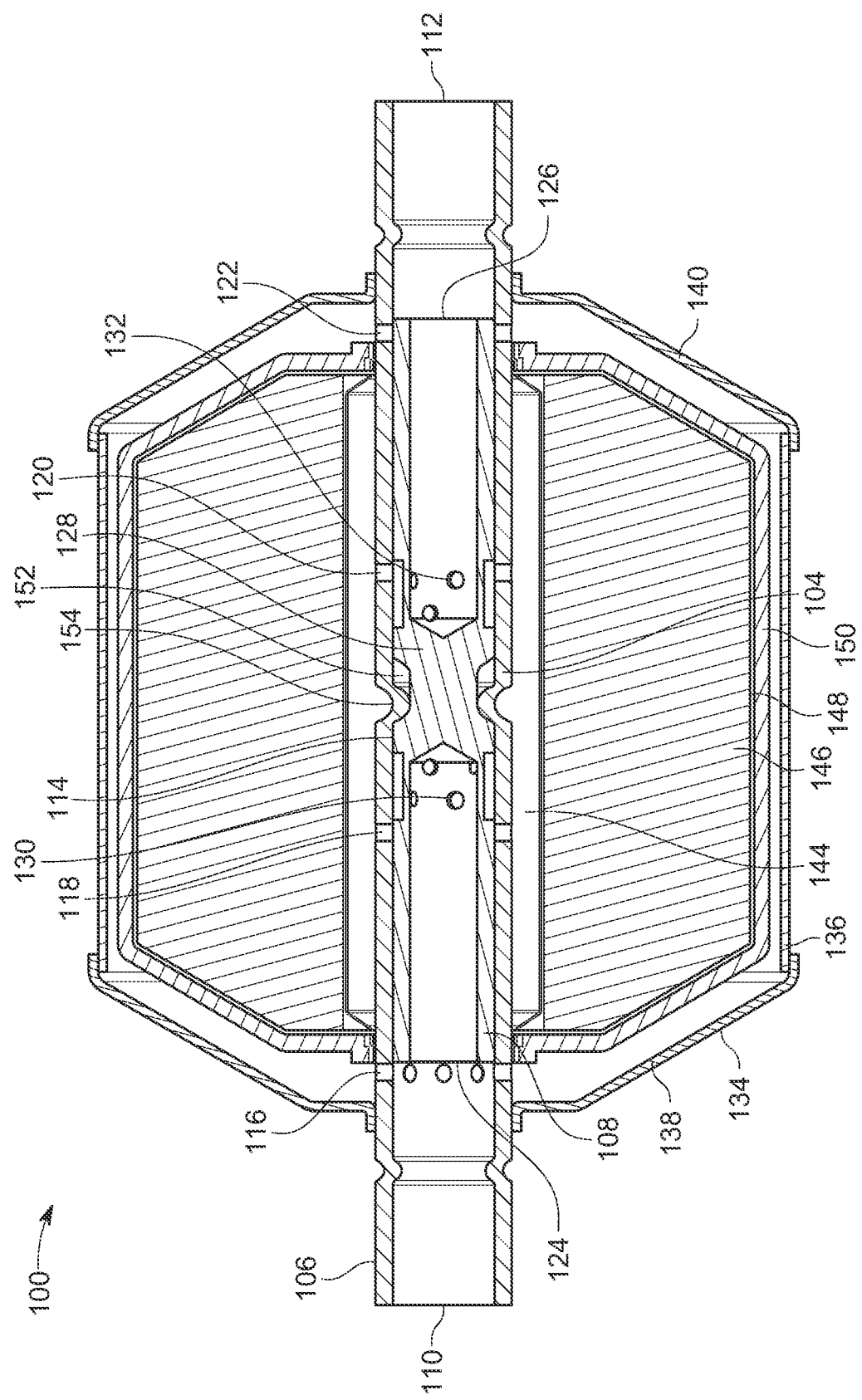
FIG. 1 is a cross-sectional view of a bi-flow or bi-directional filter drier 100 including a bi-directional valve 104 according to an exemplary embodiment of the present disclosure.

Example embodiments will now be described more fully with reference to the accompanying drawings.

Exemplary embodiments are disclosed of bi-flow or bi-directional filter driers including a center bi-directional valve construction (e.g., center tube—spool valve construction, etc.). In exemplary embodiments, a bi-directional valve is configured to be disposed within a bi-flow filter drier such that the bi-directional valve may be centered relative to (e.g., disposed along a centerline of, etc.) the bi-flow filter drier. For example, the bi-directional valve and the bi-flow filter drier may be configured such that a longitudinal centerline of the bi-directional valve is substantially aligned with a longitudinal centerline of the bi-flow filter drier.

By way of background, a conventional system may include two unidirectional valves and two filter driers to provide the necessary functionality. But as recognized herein, a bi-flow filter drier as disclosed herein (e.g., bi-flow filter 100 (FIG. 1), 400 (FIG. 4), 500 (FIG. 5), 600 (FIG. 6), 700 (FIG. 7), etc.) may advantageously provide the same or similar functionality with a reduced overall size, component and joint count as compared to such conventional systems that include two unidirectional valves and two filter driers. Exemplary embodiments disclosed herein may advantageously provide one or more of (but not necessarily any or all of) the following advantages as compared to conventional filter driers:

fewer parts;
fewer manufacturing operations;
less complicated construction (e.g., fewer parts to assemble, etc.);
a valve including a center tube or cylindrical valve body that improves pressure capabilities for a same or comparable outer shell or end cap thickness;
better volume utilization (e.g., smaller overall filter drier size or more filtering and desiccant for a standard filter drier size, etc.); and/or
easy to add/field changeable flow rater with a metering orifice (e.g., press-fit flow rater 556 with metering orifice 560 (FIG. 5), threaded flow rater 656 with metering orifice 660 (FIG. 6), etc.). Also shown in FIG. 6 is a hex or other "socket" 662 in the other side to hold the movable valve member 608 (e.g., spool, etc.) from rotating when screwing the flow rater 656 into the threaded end portion 660 of the movable valve member 608.

Figure 2:
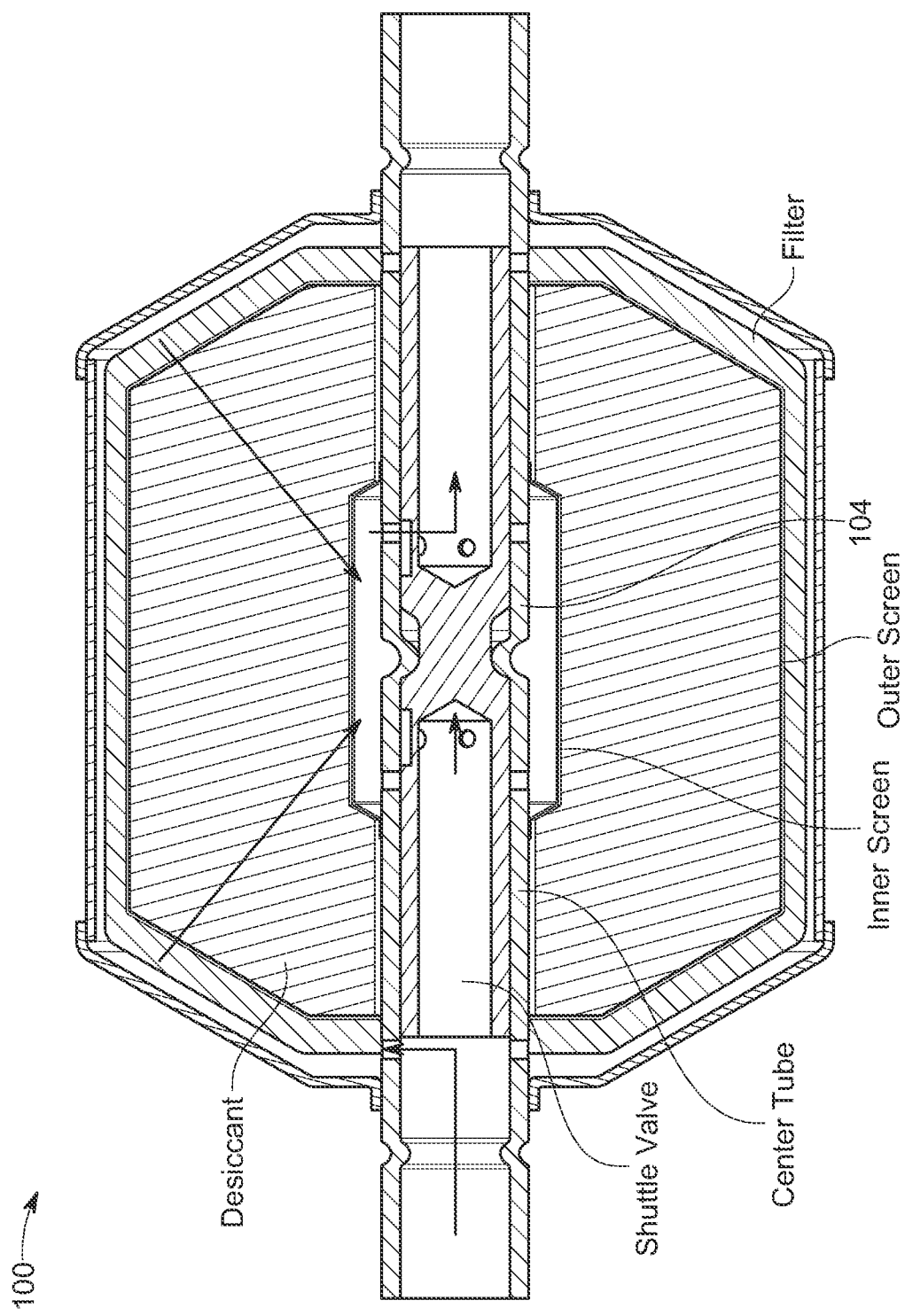
FIG. 2 is a cross-sectional view of the bi-flow filter drier shown in FIG. 1, where the arrows represent a first or forward flow direction through the valve of the bi-flow filter drier.
Figure 3:
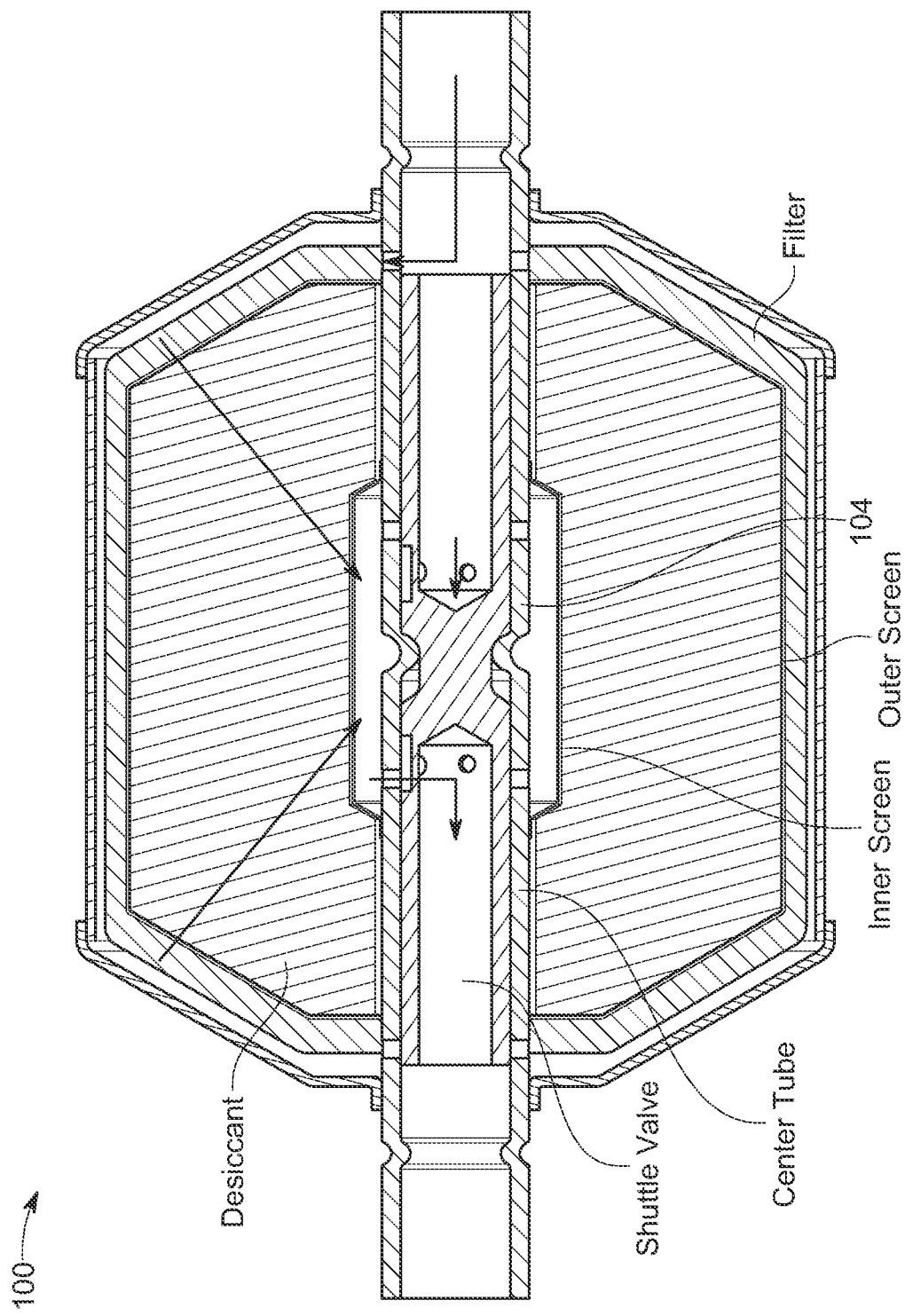
FIG. 3 is a cross-sectional view of the bi-flow filter drier shown in FIG. 1, where the arrows represent a second or reverse flow direction through the valve of the bi-flow filter drier.

FIGS. 1, 2, and 3 illustrate an exemplary embodiment of a bi-flow filter drier 100 embodying one or more aspects of the present disclosure. As shown in FIG. 1, the bi-flow filter drier 100 includes a bi-directional valve 104 along a centerline (e.g., a longitudinal centerline axis, etc.) of the bi-flow filter drier 100. By way of example, the bi-flow filter drier 100 may be used on a liquid line in a reversible refrigeration system such as a heat pump unit with bi-directional flow that reverses between air conditioning and heat-pump modes.

The valve 104 includes a valve body 106 and a movable valve member 108 (e.g., shuttle, etc.) disposed within the valve body 108. By way of example, the valve body 108 may comprise a tubular cylindrical valve body (e.g., a center tube, etc.), and the movable valve member 108 comprises a slidable cylindrical spool valve member or shuttle.

The valve body 106 includes a first end portion 110 and a second end portion 112 opposite the first end portion. The first and second end portions 110, 112 respectively define a first inlet/outlet and a second inlet/outlet. The first and second end portions 110, 112 may be configured for connecting the valve 104 to a liquid line, e.g., in a reversible refrigeration system, etc. The valve body 106 further includes a first middle or intermediate portion 114 between the first and second end portions 110, 112.

The valve body 106 also includes first and second valve openings or ports 116, 118 between the first end portion 110 and the first middle portion 114. The second port 118 is spaced apart (e.g., longitudinally spaced apart, etc.) from the first port 116 such that the second port 118 is closer to the first middle portion 114 than is the first port 116 and such that the first port 116 is closer to the first end portion 110 than is the second port 118.

The valve body 106 further includes third and fourth valve openings or ports 120, 122 between the first middle portion 114 and the second end portion 112. The third port 120 is spaced apart (e.g., longitudinally spaced apart, etc.) from the fourth port 122 such that the third port 120 is closer to the first middle portion 114 than is the fourth port 122 and such that the fourth port 122 is closer to the second end portion 112 than is the third port 120.

The movable valve member 108 includes a third end portion 124 and a fourth end portion 126 opposite the third end portion 124. The third and fourth end portions 124, 126 are in fluid communication respectively with the first inlet/outlet and the second inlet/outlet of the valve body 106. The movable valve member 108 further includes a second middle or intermediate portion 128 between the third and fourth end portions 124, 126 of the movable valve member 108.

The movable valve member 108 also includes a fifth valve opening or port 130 between the third end portion 124 and the second middle portion 128. The fifth port 130 is alignable with the second port 118 of the valve body 106 when the movable valve member 108 is in a second or reverse fluid flow position as shown in FIG. 3.

The movable valve member 108 further includes a sixth valve opening or port 132 between the fourth end portion 126 and the second middle portion 128. The sixth port 132 is alignable with the third port 120 of the valve body 106 when the movable valve member 108 is in a first or forward fluid flow position as shown in FIGS. 1 and 2.

In this illustrated embodiment, the first port 116 comprises a plurality of first valve openings or ports spaced apart (e.g., circumferentially spaced apart, etc.) from each other along the valve body 106. The second port 118 comprises a plurality of second valve openings or ports spaced apart (e.g., circumferentially spaced apart, etc.) from each other along the valve body 106. The third port 120 comprises a plurality of third valve openings or ports spaced apart (e.g., circumferentially spaced apart, etc.) from each other along the valve body 106. The fourth port 122 comprises a plurality of fourth valve openings or ports spaced apart (e.g., circumferentially spaced apart, etc.) from each other along the valve body 106. The fifth port 130 comprises a plurality of fifth valve openings or ports spaced apart (e.g., circumferentially spaced apart, etc.) from each other along the movable valve member 108. The sixth port 132 comprises a plurality of sixth valve openings or ports spaced apart (e.g., circumferentially spaced apart, etc.) from each other along the movable valve member 108.

The ports 116, 118, 20, 24 may be integrally defined by the valve body 104, e.g., machined or drilled into the valve body 104, provided via an injection molding process, etc. The ports 130, 132 may be integrally defined by movable valve member 108, e.g., machined or drilled into the movable valve member, provided via an injection molding process, etc.

The movable valve member 108 is movable relative to the valve body 104 between a first position (FIGS. 1 and 2) and a second position (FIG. 3). In the first position, the movable valve member 108 blocks and inhibits fluid flow through the second port 118 and the fourth port 122. Also in the first position, the sixth port 132 of the movable valve member 108 is aligned with the third port 120 of the valve body 106. Accordingly, fluid (e.g., refrigerant, etc.) flow is permitted along a first or forward fluid flow path (FIG. 2) defined from the first inlet/outlet of the first end portion 110, out of the valve 100 via the first port 116, into the valve 110 via the aligned third and sixth ports 120, 132, and out the second inlet/outlet of the second end portion 112.

In the second position, the movable valve member 108 blocks and inhibits fluid flow through the third port 120 and the first port 116. Also in the second position, the fifth port 130 of the movable valve member 108 is aligned with the second port 118 of the valve body 106. Accordingly, fluid (e.g., refrigerant, etc.) flow is permitted along a second or reverse fluid flow path (FIG. 3) defined from the second inlet/outlet of the second end portion 112, out of the valve 110 via the fourth port 122, into the valve 100 via the aligned fifth and second ports 130, 118, and out the first inlet/outlet of the first end portion 110.

The direction of fluid flow through the other filter drier components (e.g., filter 150, screen 148, desiccant 146, screen 144) may be essentially the same whether the movable valve member 108 is in the first position defining the first or forward flow path (FIG. 2) through the valve 100 or whether the movable valve member 108 is in the second position defining the second or reverse flow path (FIG. 3) through the valve 100.

The bi-flow filter drier 100 comprises an outer shell or housing 134 including one or more walls defining an interior compartment. As shown in FIG. 1, the housing 134 is a multi-piece housing comprising a middle housing portion 136 (e.g., a can, etc.) and first and second end caps 138, 140 coupled to the opposite first and second end portions of the middle housing portion 136. Alternatively, the bi-flow filter drier 100 may have a differently configured housing, e.g., a single piece outer shell or housing (FIG. 4), etc.

With reference back to FIG. 1, the first and second end portions 110, 112 of the valve body 106 protrude outwardly beyond the housing 134. Accordingly, the first and second end portions 110, 112 are exposed and accessible, e.g., for connecting the valve to a liquid line in a reversible refrigeration system, etc.

A first porous element 144 (e.g., an inner screen or mesh, etc.) is within the interior compartment of the housing 134. The first porous element 144 is disposed along an outer surface the valve body 106 such that the first porous element 144 is disposed over the second and third ports 118, 120 of the valve body 106. The first porous element 144 may comprise galvanized steel, aluminum, stainless steel, or other suitable material(s) depending on the particular end use application. The first porous element 144 may comprise 0.062 inch holes, 0.075 inch holes, or other suitable hole sizes depending on the particular end use application.

A desiccant 146 is within the interior compartment of the housing 134. The desiccant 146 is disposed over the first porous element 144. The desiccant 146 may comprise a molecular sieve and bonding agents.

A second porous element 148 (e.g., an outer screen or mesh, etc.) is within the interior compartment of the housing 134. The second porous element 148 is disposed over the desiccant 146. The second porous element 148 may comprise galvanized steel, aluminum, stainless steel, or other suitable material(s) depending on the particular end use application. The second porous element 148 may comprise 0.062 inch holes, 0.075 inch holes, or other suitable hole sizes depending on the particular end use application.

A filter 150 is within the interior compartment of the housing 134. The filter 150 is disposed over the second porous element 148. The filter 150 is generally between the housing 134 and the second porous element 148. The filter 150 may comprise a fiber batt filter, etc.

The first and second porous elements 144, 148 may be configured to help retain the positioning of the bi-flow filter drier components (e.g., filter 150, desiccant 146, bead drier material, etc.). The first and second porous elements 144, 148 may be configured for capturing relatively large foreign object debris (FOD), impurities, and/or other contaminants. The first and second porous elements 144, 148 may be made from the same material(s) and have the same configuration (e.g., same hole sizes, etc.) although this is not required for all embodiments. In alternative embodiments, the first porous element 144 and/or the second porous elements 148 may be eliminated or unnecessary, e.g., when a formed drier is used instead of a bead drier material, etc.

When the movable valve member 108 is in the first position, a first or forward fluid flow path (FIGS. 1 and 2) is defined from the first inlet/outlet of the valve body's first end portion 110, out through the first port 116 of the valve body 106, through the filter 150, the second porous element 148, the desiccant 146, and the first porous element 144, into the valve body 106 via the aligned third and sixth ports 120, 132 and out the second inlet/outlet of the valve body's second end portion 112.

When the movable valve member 108 is in the second position, a second or reverse fluid flow path (FIG. 3) is defined from the second inlet/outlet of the valve body's second end portion 112, out through the fourth port 122 of the valve body 106, through the filter 150, the second porous element 148, the desiccant 146, and the first porous element 144, into the valve body 106 via the aligned second and fifth ports 118, 130, and out the first inlet/outlet of the valve body's first end portion 110.

In the first position (FIGS. 1 and 2), the movable valve member 108 blocks and inhibits refrigerant (broadly, fluid) flow in the second or reverse flow direction generally from the second inlet/outlet of the valve body's second end portion 112 towards the first inlet/outlet of the valve body's first end portion 110.

In the second position (FIG. 3), the movable valve member 108 blocks and inhibits refrigerant (broadly, fluid) flow in the first or forward flow direction generally from the first inlet/outlet of the valve body's first end portion 110 towards the second inlet/outlet of the valve body's second end portion 112.

The arrows in FIG. 2 represent the first or forward flow direction through the valve 104 of the bi-flow filter drier 100. The forward flow of pressurized fluid has pushed the movable valve member 108 towards the right to thereby open/align the corresponding valve ports to define the forward flow path through the valve 104 of the bi-flow filter drier 100.

The arrows in FIG. 3 represent the second or reverse flow direction through the valve 104 of the bi-flow filter drier 100. The reverse flow of pressurized fluid has pushed the movable valve member 108 towards the left to thereby open/align the corresponding valve ports to define the reverse flow path through the valve 104 of the bi-flow filter drier 100. As shown by the arrows in FIGS. 2 and 3, the direction of fluid flow through the filter 150, second porous element 148, desiccant 146, and first porous element 144 is essentially the same whether the movable valve member 108 is in the first position defining the first or forward flow path through the valve 104 or in the second position defining the second or reverse flow path through the valve 104.

With continued reference to FIG. 1, the valve body 106 and the movable valve member 108 are configured to define first and second stops. The first stop is operable for inhibiting sliding of the movable valve member 108 within the valve body 106 beyond the first position in a direction towards the second end portion 112, and thereby align the sixth port 132 of the movable valve member 108 with the third port 120 of the valve body 106 (FIGS. 1 and 2). The second stop is operable for inhibiting sliding of the movable valve member 108 within the valve body 106 beyond the second position in a direction towards the first end portion 110, and thereby align the fifth port 130 of the movable valve member 108 with the second port 118 of the valve body 106 (FIG. 3).

In this exemplary embodiment, the second middle portion 128 of the movable valve member 108 includes a recessed portion 152 defined between opposing first and second wall portions. The first middle portion 114 of the valve body 106 includes a crimped portion 154 (broadly, an inwardly protruding portion or protrusion) that inwardly protrudes into the recessed portion 152 of the movable valve member 108. Contact of the crimped portion 154 of the valve body 106 with the first wall portion of the movable valve member 108 (FIGS. 1 and 3) is operable as a first stop that inhibits sliding of the movable valve member 108 within the valve body 106 beyond the first position. Contact of the crimped portion 154 of the valve body 106 with the second wall portion of the movable valve member 108 (FIG. 3) is operable as a second stop that inhibits sliding of the movable valve member 108 within the valve body 106 beyond the second position.

Figure 4:
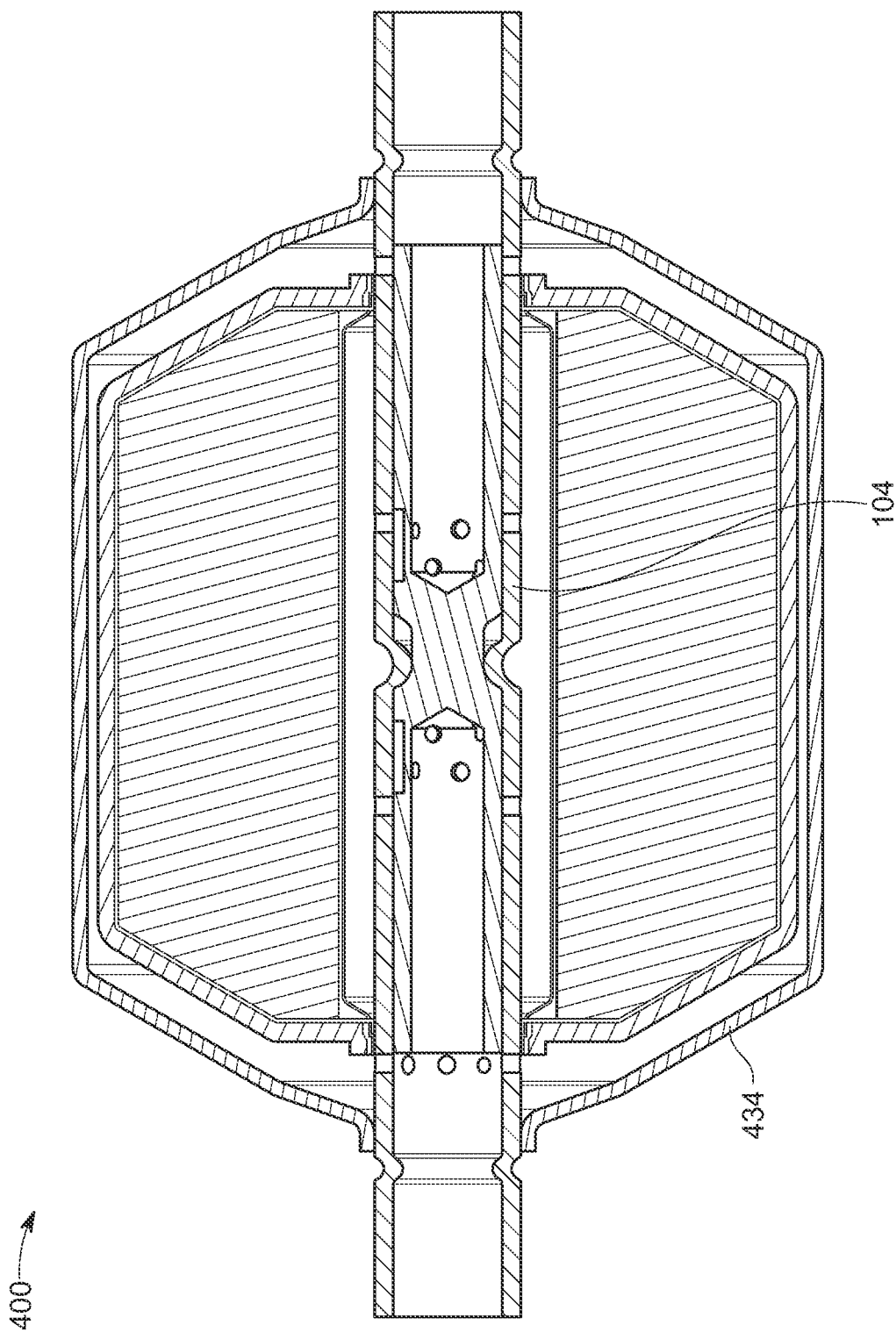
FIG. 4 is a cross-sectional view of a bi-flow or bi-directional filter drier 400 including a bi-directional valve 404 according to an exemplary embodiment of the present disclosure.

FIG. 4 illustrates an exemplary embodiment of a bi-flow filter drier 400 including a bi-directional valve 404 and a single piece outer shell or housing 434. The single piece outer shell or housing 434 may comprise a rolled single piece copper shell, etc. The other features of the bi-flow filter drier 400 (e.g., valve body, movable valve member, filter, first and second porous elements, desiccant, etc.) may be essentially identical or similar to the corresponding features of the bi-flow filter drier 100. For the sake of brevity, these identical or similar features that the bi-flow filter drier 400 shares with the bi-flow filter drier 100 will not be individually repeated for the bi-flow filter drier 400.

Figure 5:
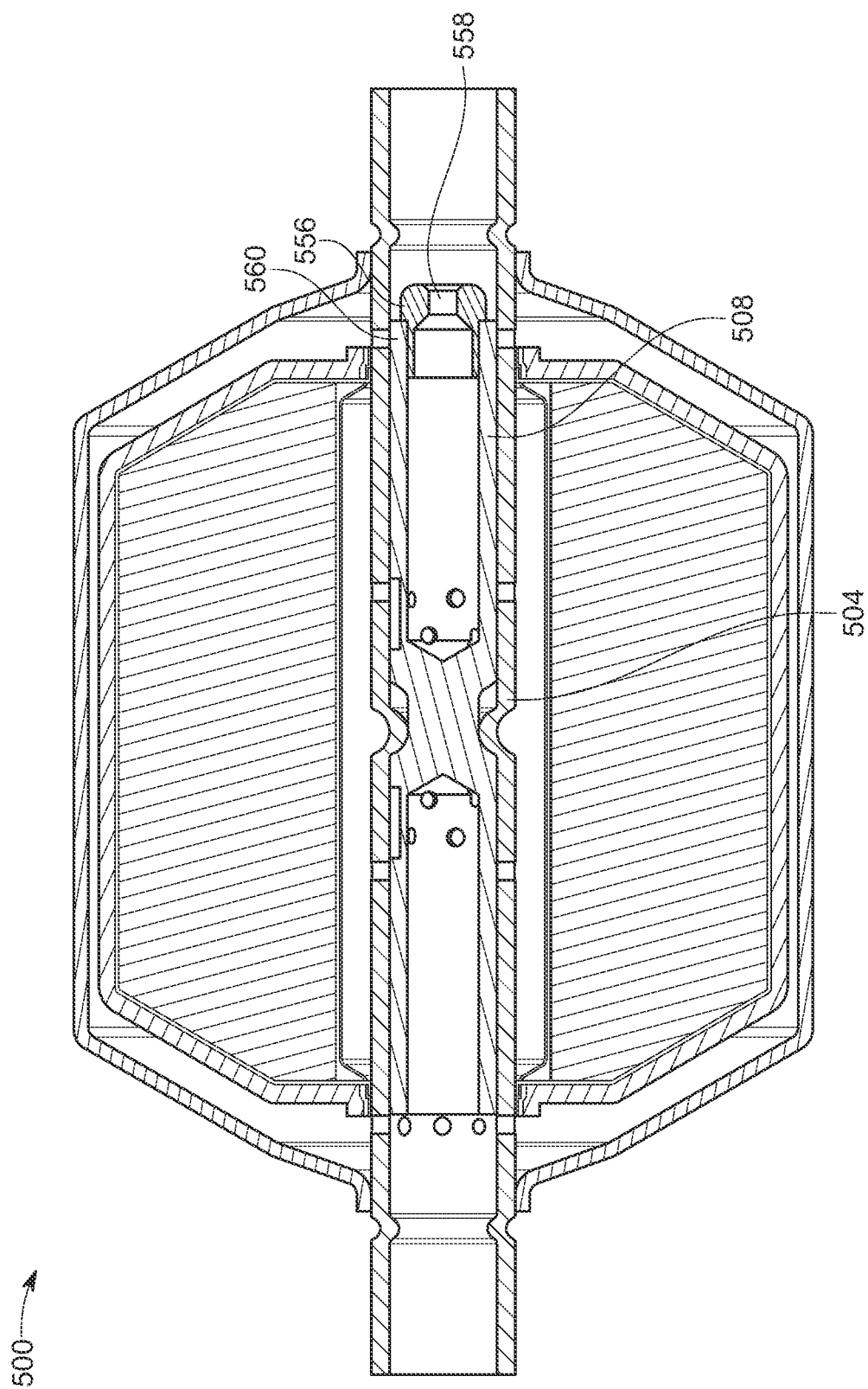
FIG. 5 is a cross-sectional view of a bi-flow or bi-directional filter drier 500 including a bi-directional valve equipped with a flow rater defining a metering orifice according to an exemplary embodiment of the present disclosure.
Figure 6:
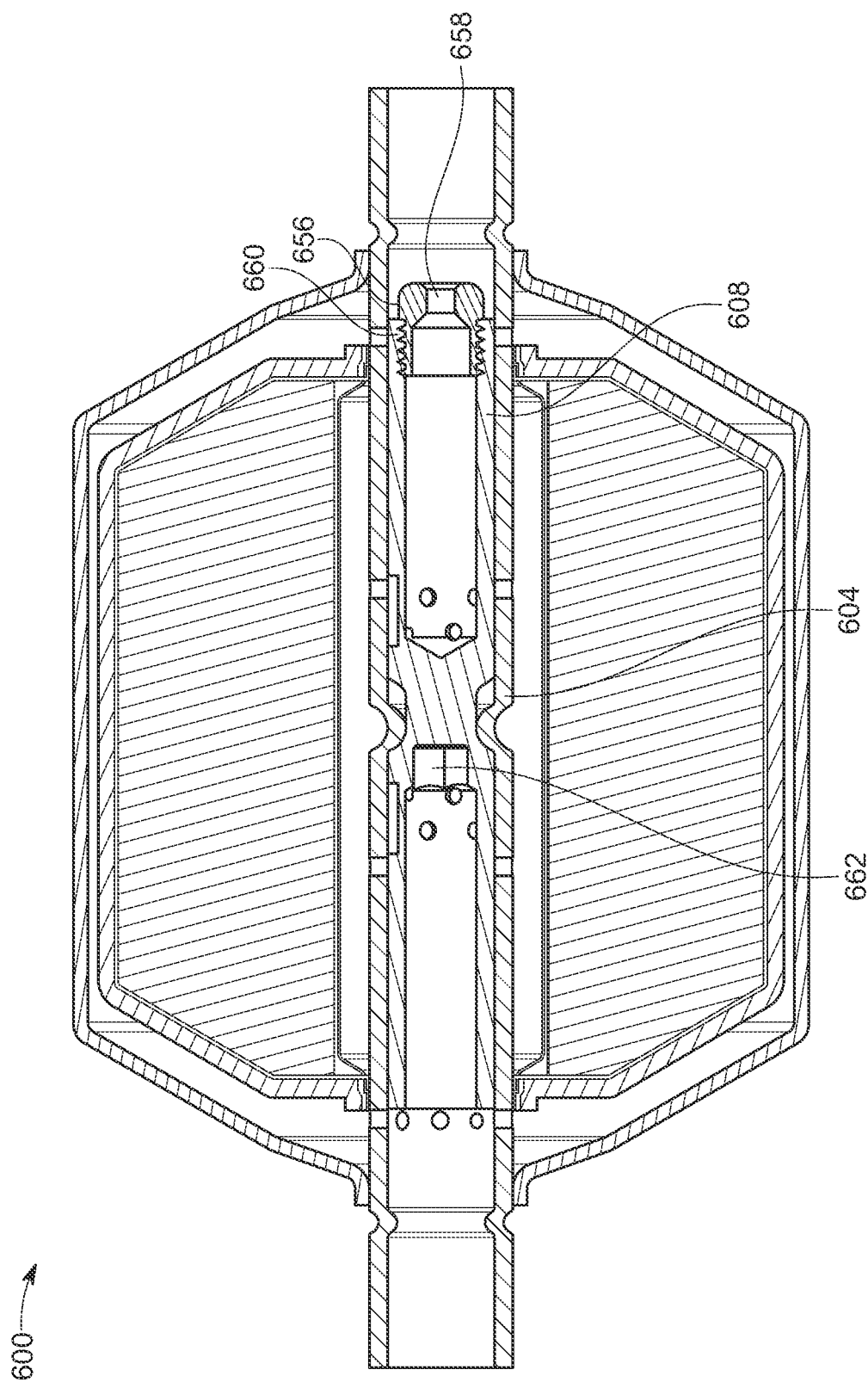
FIG. 6 is a cross-sectional view of a bi-flow or bi-directional filter drier 500 including a bi-directional valve equipped with a flow rater defining a metering orifice according to an exemplary embodiment of the present disclosure.

FIG. 5 illustrates an exemplary embodiment of a bi-flow filter drier 500 including a bi-directional valve 504 equipped with a flow rater 556 defining a metering orifice 558. The flow rater 556 is configured to be removably engaged with an end portion 560 of the movable valve member 508. In this exemplary embodiment, the flow rater 556 is configured to be removably engaged with the end portion 560 of the movable valve member 508 via a press fit engagement of the flow rater 556 into the end portion 560 of the movable valve member 508.

The flow rater 556 limits flow in only one direction that being the heat pump direction, which in this example would be the first or forward flow direction through the valve 504 (e.g., see arrows in FIG. 2, etc.). Accordingly, the bi-flow filter drier 500 equipped with the flow rater 556 can provide an expansion device in the outdoor unit for operation as a heat pump. With the flow rater 556 in place, there is still full flow in the opposite direction, e.g., for air conditioning, which in this example, would be the second or reverse flow direction through the valve 504 (e.g., see arrows in FIG. 3, etc.).

The metering orifice 558 of the flow rater 556 may serve as an expansion orifice when flowing in a heat pump direction. The orifice 558 may be sized for the desired pressure drop at the nominal tonnage. In cooling mode, the bi-flow filter drier 500 is in free flow as the flow rater 556 of the bi-flow filter drier 500 would not be in the flow path. Also in cooling mode, the expansion device elsewhere in the system would be a thermostatic expansion valve (TXV) or a fixed orifice located at the indoor coil.

The flow rater 556 integrates what is historically a separate component as normally the filter drier should have a minimal effect on flow. For example, the flow rater 556 may be configured to act as a fixed orifice for the outside coil in heat pump mode when the outside coil is the evaporator coil. In air conditioning mode, the valve 504 would allow full flow in the opposite direction.

The ability to field install the flow rater 556 with the metering orifice 558 enables field configuration of the valve 504, e.g., for using a large filter drier on a smaller system, etc. For example, the metering orifice 558 of the flow rater 556 may be configured for a 3-ton system, such that the valve 504 equipped with flow rater 556 may then enable the use of a 5-ton capable unit on a 3-ton system. This might happen because the technician wants the increased capacity or to reduce the number of different parts caned on the truck.

The other features of the bi-flow filter drier 500 (e.g., valve body, movable valve member, filter, first and second porous elements, desiccant, etc.) may be essentially identical or similar to the corresponding features of the bi-flow filter drier 100. For the sake of brevity, these identical or similar features that the bi-flow filter drier 500 shares with the bi-flow filter drier 100 will not be individually repeated for the bi-flow filter drier 500.

FIG. 6 illustrates an exemplary embodiment of a bi-flow filter drier 600 including a bi-directional valve 604 equipped with a flow rater 656 defining a metering orifice 658. In this exemplary embodiment, the flow rater 656 is configured to be removably engaged with the end portion 660 of the movable valve member 608 via a threaded engagement of the flow rater 656 into the end portion 660 of the movable valve member 608. The flow rater 656 includes a threaded portion (e.g., an externally threaded portion, etc.) configured for threaded engagement with a threaded portion (e.g., an internally threaded portion, etc.) of the movable valve member 608. Also shown in FIG. 6 is a hex or other "socket" 662 in the other side to hold the movable valve member 608 (e.g., spool, etc.) from rotating when screwing the flow rater 656 into the threaded end portion 660 of the movable valve member 608.

The flow rater 656 limits flow in only one direction that being the heat pump direction, which in this example would be the first or forward flow direction through the valve 604 (e.g., see arrows in FIG. 2, etc.). Accordingly, the bi-flow filter drier 600 equipped with the flow rater 656 can provide an expansion device in the outdoor unit for operation as a heat pump. With the flow rater 656 in place, there is still full flow in the opposite direction, e.g., for air conditioning, which in this example, would be the second or reverse flow direction through the valve 604 (e.g., see arrows in FIG. 3, etc.).

The metering orifice 658 of the flow rater 656 may serve as an expansion orifice when flowing in a heat pump direction. The orifice 658 may be sized for the desired pressure drop at the nominal tonnage. In cooling mode, the bi-flow filter drier 600 is in free flow as the flow rater 656 of the bi-flow filter drier 600 would not be in the flow path. Also in cooling mode, the expansion device elsewhere in the system would be a thermostatic expansion valve (TXV) or a fixed orifice located at the indoor coil.

The flow rater 656 integrates what is historically a separate component as normally the filter drier should have a minimal effect on flow. For example, the flow rater 656 may be configured to act as a fixed orifice for the outside coil in heat pump mode when the outside coil is the evaporator coil. In air conditioning mode, the valve 604 would allow full flow in the opposite direction.

As before with flow rater 556, the ability to field install the flow rater 656 with the metering orifice 658 enables field configuration of the valve 604, e.g., for using a large filter drier on a smaller system, etc. For example, the metering orifice 658 of the flow rater 656 may be configured for a 3-ton system, such that the valve 604 equipped with flow rater 656 may then enable the use of a 5-ton capable unit on a 3-ton system.

The other features of the bi-flow filter drier 600 (e.g., valve body, movable valve member, filter, first and second porous elements, desiccant, etc.) may be essentially identical or similar to the corresponding features of the bi-flow filter drier 100. For the sake of brevity, these identical or similar features that the bi-flow filter drier 600 shares with the bi-flow filter drier 100 will not be individually repeated for the bi-flow filter drier 600.

Figure 7:
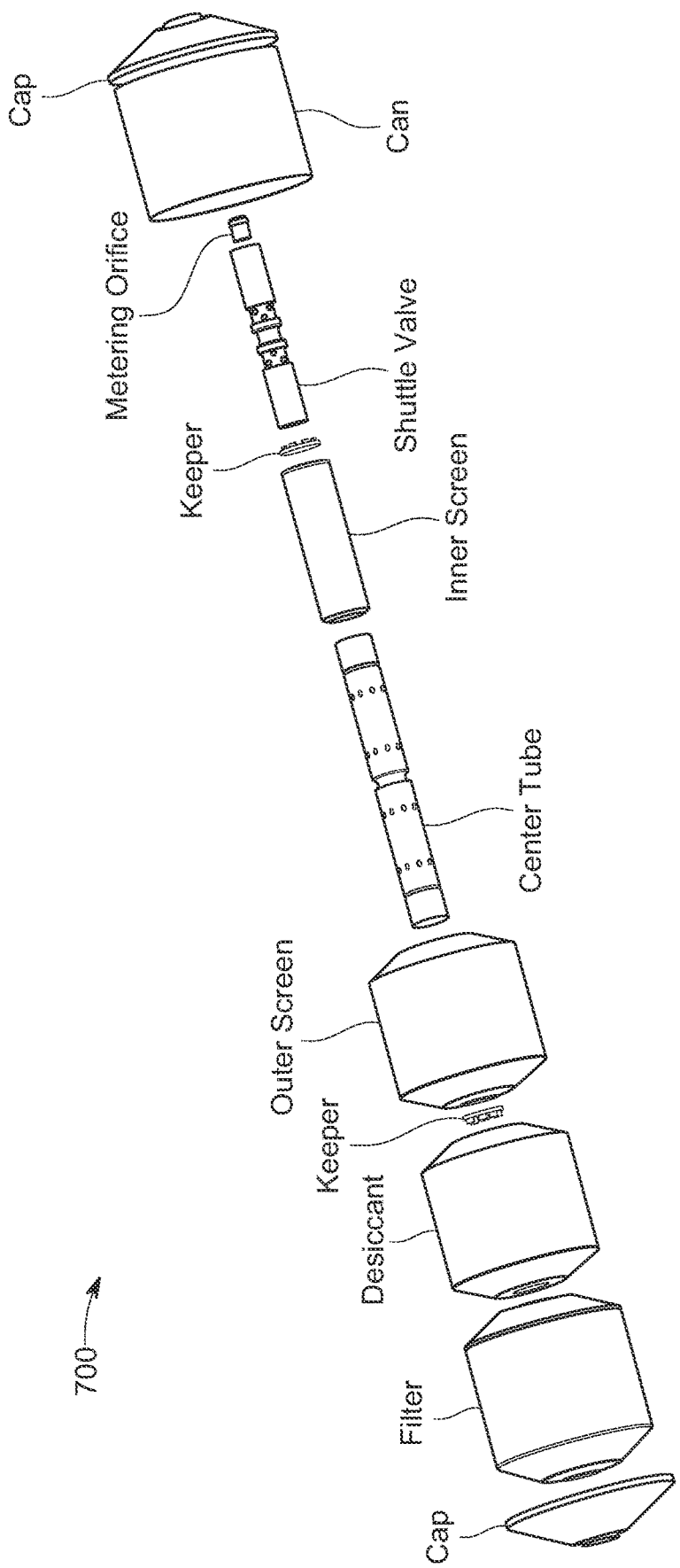
FIG. 7 is an exploded perspective view of an example construction of a bi-flow filter drier according to an exemplary embodiment of the present disclosure.

FIG. 7 is an exploded perspective view of an example construction of a bi-flow filter drier 700 according to an exemplary embodiment of the present disclosure. As shown in FIG. 7, optional keepers (e.g., spring clips, etc.) may be positioned on the center tube at the ends of the inner screen to help retain the positioning of the inner screen along the center tube. The other features of the bi-flow filter drier 700 may be essentially identical or similar to the corresponding features of the bi-flow filter drier 100. For the sake of brevity, these identical or similar features that the bi-flow filter drier 700 shares with the bi-flow filter drier 100 will not be individually repeated for the bi-flow filter drier 700.

In exemplary embodiments, a valve for a bi-flow filter drier comprises a valve body and a movable valve member disposed within the valve body. The valve body includes a first end portion and a second end portion opposite the first end portion. The first and second end portions respectively define a first inlet/outlet and a second inlet/outlet. The first and second end portions may be configured for connecting the valve to a liquid line, e.g., in a reversible refrigeration system, etc. The valve body further includes a first middle or intermediate portion between the first and second end portions.

The valve body also includes first and second valve openings or ports between the first end portion and the first middle portion. The second port is spaced apart (e.g., longitudinally spaced apart, etc.) from the first port such that the second port is closer to the first middle portion than is the first port and such that the first port is closer to the first end portion than is the second port.

The valve body further includes third and fourth valve openings or ports between the first middle portion and the second end portion. The third port is spaced apart (e.g., longitudinally spaced apart, etc.) from the fourth port such that the third port is closer to the first middle portion than is the fourth port and such that the fourth port is closer to the second end portion than is the third port.

The movable valve member includes a third end portion and a fourth end portion opposite the third end portion. The third and fourth end portions are in fluid communication respectively with the first inlet/outlet and the second inlet/outlet of the valve body. The movable valve member further includes a second middle or intermediate portion between the third and fourth end portions of the movable valve member.

The movable valve member also includes a fifth valve opening or port between the third end portion and the second middle portion. The fifth port is alignable with the second port of the valve body.

The movable valve member further includes a sixth valve opening or port between the fourth end portion and the second middle portion. The sixth port is alignable with the third port of the valve body.

The movable valve member is movable relative to the valve body between a first position and a second position. In the first position, the movable valve member blocks and inhibits fluid flow through the second port and the fourth port. Also in the first position, the sixth port of the movable valve member is aligned with the third port of the valve body. Accordingly, fluid flow is permitted along a first or forward fluid flow path defined from the first inlet/outlet, out of the valve via the first port, into the valve via the aligned third and sixth ports, and out the second inlet/outlet.

In the second position, the movable valve member blocks and inhibits fluid flow through the third and first ports. Also in the second position, the fifth port of the movable valve member is aligned with the second port of the valve body. Accordingly, fluid flow is permitted along a second or reverse fluid flow path defined from the second inlet/outlet, out of the valve via the fourth port, into the valve via the aligned fifth and second ports, and out the first inlet/outlet.

The direction of fluid flow through the other filter drier components (e.g., filter(s), screen(s), desiccant(s), etc.) may be essentially the same whether the movable valve member is in the first position defining the first or forward flow path through the valve or whether the movable valve member is in the second position defining the second or reverse flow path through the valve.

In exemplary embodiments, the valve further comprises a flow rater including a metering orifice. The flow rater is configured to be removably engaged with the fourth end portion of the movable valve member. For example, the flow rater may be configured to be removably engaged with the fourth end portion of the movable valve member via a press fit engagement of the flow rater into the fourth end portion of the movable valve member. Or, for example, the flow rater may include a threaded portion (e.g., an externally threaded portion, etc.) configured for threaded engagement within a threaded portion (e.g., an internally threaded portion, etc.) of the movable valve member.

In exemplary embodiments, the flow rater is configured to limit fluid flow in a first or forward flow direction while permitting full fluid flow in a second or reverse flow direction. The flow rater may be configured to act as a fixed orifice for an outside coil in heat pump mode when the outside coil is the evaporator coil and to allow full flow in the opposite direction in air conditioning mode.

In exemplary embodiments, the valve comprises a shuttle valve including first and second interior chambers cooperatively defined by the valve body and the movable valve member. The first interior chamber is in fluid communication with the first inlet/outlet defined by the first end portion of the valve body. The second interior chamber is in fluid communication with the second inlet/outlet defined by the second end portion of the valve body. The shuttle valve is configured such that pressurized fluid entering the first interior chamber via the first inlet/outlet is operable for pushing the movable valve member to slide away from the first inlet/outlet towards an opposite end of the first interior chamber and towards the first position. The shuttle valve is also configured such that pressurized fluid entering the second interior chamber via the second inlet/outlet is operable for pushing the movable valve member to slide away from the second inlet/outlet towards an opposite end of the second interior chamber and towards the second position.

In exemplary embodiments, the valve body and the movable valve member are configured to define first and second stops. The first stop is operable for inhibiting sliding of the movable valve member within the valve body beyond the first position in a direction towards the second end portion, and thereby align the sixth port of the movable valve member with the third port of the valve body. The second stop is operable for inhibiting sliding of the movable valve member within the valve body beyond the second position in a direction towards the first end portion, and thereby align the fifth port of the movable valve member with the second port of the valve body.

In exemplary embodiments, the second middle portion of the movable valve member includes a recessed portion defined between opposing first and second wall portions. The first middle portion of the valve body includes a crimped portion that inwardly protrudes into the recessed portion of the movable valve member. Contact of the crimped portion of the valve body with the first wall portion of the movable valve member is operable as a first stop that inhibits sliding of the movable valve member within the valve body beyond the first position. Contact of the crimped portion of the valve body with the second wall portion of the movable valve member is operable as a second stop that inhibits sliding of the movable valve member within the valve body beyond the second position.

In exemplary embodiments, the movable valve member is slidably disposed within the valve body such that: fluid flow into the first inlet/outlet applies pressure to the movable valve member for slidably moving the movable valve member away from the first inlet/outlet towards the first position; and fluid flow into the second inlet/outlet applies pressure to the movable valve member for slidably moving the movable valve member away from the second inlet/outlet towards the second position.

In exemplary embodiments, the first port comprises a plurality of first valve openings or ports spaced apart (e.g., circumferentially spaced apart, etc.) from each other along the valve body. The second port comprises a plurality of second valve openings or ports spaced apart (e.g., circumferentially spaced apart, etc.) from each other along the valve body. The third port comprises a plurality of third valve openings or ports spaced apart (e.g., circumferentially spaced apart, etc.) from each other along the valve body. The fourth port comprises a plurality of fourth valve openings or ports spaced apart (e.g., circumferentially spaced apart, etc.) from each other along the valve body. The fifth port comprises a plurality of fifth valve openings or ports spaced apart (e.g., circumferentially spaced apart, etc.) from each other along the movable valve member. The sixth port comprises a plurality of sixth valve openings or ports spaced apart (e.g., circumferentially spaced apart, etc.) from each other along the movable valve member.

In exemplary embodiments, the valve body comprises a tubular cylindrical valve body including a wall defining the first, second, third, and fourth ports. And the movable valve member comprises a cylindrical spool valve member.

In exemplary embodiments, a bi-flow filter drier comprises a valve disclosed herein. The valve may be disposed along a centerline of the bi-flow filter drier. The valve may include a longitudinal centerline substantially aligned with a longitudinal centerline of the bi-flow filter drier.

In exemplary embodiments, the bi-flow filter drier comprises a housing including one or more walls defining an interior compartment. One or more filtration mediums are within the interior compartment. A desiccant is within the interior compartment. The one or more walls of the housing may comprise a single wall defining the interior compartment whereby the housing has a single-piece monolithic construction. The first and second end portions of the valve body may protrude outwardly beyond the housing, whereby the first and second end portions are exposed and accessible for connecting the valve to a liquid line in a reversible refrigeration system.

In exemplary embodiments, the bi-flow filter drier comprises a housing including one or more walls defining an interior compartment. A first porous element (e.g., an inner screen or mesh, etc.) is within the interior compartment of the housing and disposed along an outer surface the valve body such that the first porous element is disposed over the second and third ports of the valve body. A desiccant is within the interior compartment of the housing and disposed over the first porous element. A second porous element (e.g., an outer screen or mesh, etc.) is within the interior compartment of the housing and disposed over the desiccant. A filter is within the interior compartment of the housing and disposed over the second porous element. When the movable valve member is in the first position, a first or forward fluid flow path is defined from the first inlet/outlet of the valve body out through the first port of the valve body, through the filter, the second porous element, the desiccant, and the first porous element, into the valve body via the aligned third and sixth ports and out the second inlet/outlet. When the movable valve member is in the second position, a second or reverse fluid flow path is defined from the second inlet/outlet of the valve body out through the fourth port of the valve body, through the filter, the second porous element, the desiccant, and the first porous element, into the valve body via the aligned second and fifth ports, and out the first inlet/outlet. The direction of fluid flow through the filter, second porous element, desiccant, and first porous element may be essentially the same whether the movable valve member is in the first position defining the first or forward flow path through the valve or in the second position defining the second or reverse flow path through the valve.

In exemplary embodiments, a bi-directional valve for a bi-flow filter drier comprises a valve body and a movable valve member slidably disposed within the valve body. The valve body is configured to be disposed within the bi-flow filter drier such that the valve body is centered relative to the bi-flow filter drier.

The valve body includes a first end portion and a second end portion opposite the first end portion. The first and second end portions respectively define a first inlet/outlet and a second inlet/outlet.

The movable valve member is configured such that the movable valve member is movable within the valve body between a first position and a second position.

When the movable valve member is in the first position, a flow of refrigerant (broadly, fluid) is permitted in a first or forward flow direction from the first inlet/outlet through the valve of the bi-flow filter drier to the second inlet/outlet. Also in the first position, the movable valve member blocks and inhibits refrigerant flow in a second or reverse flow direction from the second inlet/outlet through the valve of the bi-flow filter drier to the first inlet/outlet.

When the moveable valve member is in the second position, refrigerant flow is permitted in the second or reverse flow direction from the second inlet/outlet through the valve of the bi-flow filter drier to the first inlet/outlet. Also in the second position, the movable valve member blocks and inhibits refrigerant flow in the first or forward flow direction from the first inlet/outlet through the valve of the bi-flow filter drier to the second inlet/outlet.

The direction of fluid flow through the other filter drier components (e.g., filter(s), screen(s), desiccant(s), etc.) may be essentially the same whether the movable valve member is in the first position defining the first or forward flow path through the valve or whether the movable valve member is in the second position defining the second or reverse flow path through the valve.

In exemplary embodiments, the valve further comprises a flow rater including a metering orifice. The flow rater is configured to be removably engaged with an end portion of the movable valve member. For example, the flow rater may be configured to be removably engaged with the end portion of the movable valve member via a press fit engagement of the flow rater into the end portion of the movable valve member. Or, for example, the flow rater may include a threaded portion (e.g., an externally threaded portion, etc.) configured for threaded engagement within a threaded portion (e.g., an internally threaded portion, etc.) of the movable valve member.

In exemplary embodiments, the flow rater is configured to limit fluid flow in a first or forward flow direction while permitting full fluid flow in a second or reverse flow direction. The flow rater may be configured to act as a fixed orifice for an outside coil in heat pump mode when the outside coil is the evaporator coil and to allow full flow in the opposite direction in air conditioning mode.

In exemplary embodiments, the valve comprises a shuttle valve including first and second interior chambers cooperatively defined by the valve body and the movable valve member. The first interior chamber is in fluid communication with the first inlet/outlet defined by the first end portion of the valve body. The second interior chamber is in fluid communication with the second inlet/outlet defined by the second end portion of the valve body. The shuttle valve is configured such that pressurized fluid entering the first interior chamber via the first inlet/outlet is operable for pushing the movable valve member to slide away from the first inlet/outlet towards an opposite end of the first interior chamber and towards the first position. The shuttle valve is also configured such that pressurized fluid entering the second interior chamber via the second inlet/outlet is operable for pushing the movable valve member to slide away from the second inlet/outlet towards an opposite end of the second interior chamber and towards the second position.

In exemplary embodiments, the valve body and the movable valve member are configured to define first and second stops. The first stop is operable for inhibiting sliding of the movable valve member within the valve body beyond the first position in a direction towards the second end portion, and thereby align the sixth port of the movable valve member with the third port of the valve body. The second stop is operable for inhibiting sliding of the movable valve member within the valve body beyond the second position in a direction towards the first end portion, and thereby align the fifth port of the movable valve member with the second port of the valve body.

In exemplary embodiments, the movable valve member includes a recessed portion defined between opposing first and second wall portions. The valve body includes a crimped portion that inwardly protrudes into the recessed portion of the movable valve member. Contact of the crimped portion of the valve body with the first wall portion of the movable valve member is operable as a first stop that inhibits sliding of the movable valve member within the valve body beyond the first position. Contact of the crimped portion of the valve body with the second wall portion of the movable valve member is operable as a second stop that inhibits sliding of the movable valve member within the valve body beyond the second position.

In exemplary embodiments, the movable valve member is slidably disposed within the valve body such that: fluid flow into the first inlet/outlet applies pressure to the movable valve member for slidably moving the movable valve member away from the first inlet/outlet towards the first position; and fluid flow into the second inlet/outlet applies pressure to the movable valve member for slidably moving the movable valve member away from the second inlet/outlet towards the second position.

In exemplary embodiments, a bi-flow filter drier comprises a valve disclosed herein that is disposed along a centerline of the bi-flow filter drier. The valve may include a longitudinal centerline substantially aligned with a longitudinal centerline of the bi-flow filter drier.

In exemplary embodiments, the bi-flow filter drier comprises a housing including one or more walls defining an interior compartment. One or more filtration mediums are within the interior compartment. A desiccant is within the interior compartment. When the movable valve member is in the first position, a first or forward fluid flow path is defined from the first inlet/outlet of the valve body, out of the valve body, through the one or more filtration mediums and the desiccant, into the valve body, and out the second inlet/outlet of the valve body. When the movable valve member is in the second position, a second or reverse fluid flow path is defined from the second inlet/outlet of the valve body, out of the valve body, through the one or more filtration mediums and the desiccant, into the valve body, and out the first inlet/outlet of the valve body. The direction of fluid flow through one or more filtration mediums and the desiccant may be essentially the same whether the movable valve member is in the first position defining the first or forward flow path through the valve or whether the movable valve member is in the second position defining the second or reverse flow path through the valve.

The one or more walls of the housing may comprise a single wall defining the interior compartment whereby the housing has a single-piece monolithic construction. The first and second end portions of the valve body may protrude outwardly beyond the housing, whereby the first and second end portions are exposed and accessible for connecting the valve to a liquid line in a reversible refrigeration system.

In exemplary embodiments, the bi-flow filter drier comprises a housing including one or more walls defining an interior compartment. A first porous element (e.g., an inner screen or mesh, etc.) is within the interior compartment of the housing and disposed along an outer surface the valve body such that the first porous element is disposed over the second and third ports of the valve body. A desiccant is within the interior compartment of the housing and disposed over the first porous element. A second porous element (e.g., an outer screen or mesh, etc.) is within the interior compartment of the housing and disposed over the desiccant. A filter is within the interior compartment of the housing and disposed over the second porous element. When the movable valve member is in the first position, a first or forward fluid flow path is defined from the first inlet/outlet of the valve body, out of the valve body, through the filter, the second porous element, the desiccant, and the first porous element, into the valve body, and out the second inlet/outlet of the valve body. When the movable valve member is in second position, a second or reverse fluid flow path is defined from the second inlet/outlet of the valve body, out of the valve body, through the filter, the second porous element, the desiccant, and the first porous element, into the valve body, and out the first inlet/outlet of the valve body. The direction of fluid flow through the filter, second porous element, desiccant, and first porous element may be essentially the same whether the movable valve member is in the first position defining the first or forward flow path through the valve or in the second position defining the second or reverse flow path through the valve.

In exemplary embodiments, a bi-flow filter drier comprises a housing including one or more walls defining an interior compartment. One or more filtration mediums are within the interior compartment. A desiccant is within the interior compartment. A bi-directional valve is disposed within the interior compartment such that the valve is centered relative to the bi-flow filter drier.

The valve includes a valve body and a movable valve member. The valve body includes first and second end portions respectively defining a first inlet/outlet and a second inlet/outlet.

The movable valve member is slidably disposed within the valve body. The movable valve member is configured such that the movable valve member is movable within the valve body between a first position and a second position. When the movable valve member is in the first position, refrigerant flow is permitted in a first or forward flow direction from the first inlet/outlet of the valve body, out of the valve body, through the one or more filtration mediums and the desiccant, into the valve body, and out the second inlet/outlet of the valve body. When the movable valve member is in the second position, refrigerant flow is permitted in a second or reverse flow direction from the second inlet/outlet of the valve body, out of the valve body, through the one or more filtration mediums and the desiccant, into the valve body, and out the first inlet/outlet of the valve body. When the movable valve member is in the first position, the movable valve member blocks and inhibits refrigerant flow in the second or reverse flow direction. When the movable valve member is in the second position, the movable valve member blocks and inhibits refrigerant flow in the first or forward flow direction.

The direction of fluid flow through the other filter drier components (e.g., One or more filtration mediums, desiccant, etc.) may be essentially the same whether the movable valve member is in the first position defining the first or forward flow path through the valve or whether the movable valve member is in the second position defining the second or reverse flow path through the valve.

In exemplary embodiments of the bi-flow filter drier, the valve includes a longitudinal centerline substantially aligned with a longitudinal centerline of the bi-flow filter drier.

In exemplary embodiments, the valve bi-flow filter drier further comprises a flow rater including a metering orifice is configured to be removably engaged with an end portion of the movable valve member. For example, the flow rater may be configured to be removably engaged with the end portion of the movable valve member via a press fit engagement of the flow rater into the end portion of the movable valve member. Or, for example, the flow rater may include a threaded portion (e.g., an externally threaded portion, etc.) configured for threaded engagement within a threaded portion (e.g., an internally threaded portion, etc.) of the movable valve member.

In exemplary embodiments, the flow rater is configured to limit fluid flow in a first or forward flow direction while permitting full fluid flow in a second or reverse flow direction. The flow rater may be configured to act as a fixed orifice for an outside coil in heat pump mode when the outside coil is the evaporator coil and to allow full flow in the opposite direction in air conditioning mode.

In exemplary embodiments of the bi-flow filter drier, the one or more walls of the housing comprise a single wall defining the interior compartment whereby the housing has a single-piece monolithic construction. And the first and second end portions of the valve body protrude outwardly beyond the housing, whereby the first and second end portions are exposed and accessible for connecting the valve to a liquid line in a reversible refrigeration system.

In exemplary embodiments of the bi-flow filter drier, the one or more filtration mediums comprise first and second porous elements and a filter. The first porous element (e.g., an inner screen or mesh, etc.) is within the interior compartment of the housing and disposed along an outer surface of the valve. The desiccant is disposed over the first porous element. The second porous element (e.g., an outer screen or mesh, etc.) is within the interior compartment of the housing and disposed over the desiccant. The filter is within the interior compartment of the housing and disposed over the second porous element. When the movable valve member is in the first position, a first or forward fluid flow path is defined from the first inlet/outlet of the valve body, out of the valve body, through the filter, the second porous element, the desiccant, and the first porous element, into the valve body, and out the second inlet/outlet of the valve body. When the movable valve member is in second position, a second or reverse fluid flow path is defined from the second inlet/outlet of the valve body, out of the valve body, through the filter, the second porous element, the desiccant, and the first porous element, into the valve body, and out the first inlet/outlet of the valve body.

Exemplary embodiments of valves and filter driers disclosed herein may be used in a wide range of systems, such as refrigerated cases (e.g., supermarket cases, etc.), refrigerated walk-ins, HVAC systems including large commercial scale HVAC systems or refrigeration systems, electric bus air conditioning and heat pump systems, commercial heat pump systems, modular air-conditioning systems, process chillers, etc. Exemplary embodiments of valves disclosed herein may also be used with any medium temperature or low temperature refrigeration such as convenience store, ice machine, grocery store, pharmaceutical production or storage, commercial air conditioning, residential air conditioning, humidification and de-humidification systems, marijuana driers, etc. Accordingly, aspects of the present disclosure should not be limited to use with any one particular type of system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes such feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve for a bi-flow filter drier comprising a valve body and a movable valve member disposed within the valve body;
   wherein the valve body includes:
   a first end portion and a second end portion opposite the first end portion, the first and second end portions respectively defining a first inlet/outlet and a second inlet/outlet;
   a first middle portion between the first and second end portions;
   first and second ports between the first end portion and the first middle portion, the second port spaced apart from the first port such that the second port is closer to the first middle portion than is the first port and such that the first port is closer to the first end portion than is the second port; and
   third and fourth ports between the first middle portion and the second end portion, the third port spaced apart from the fourth port such that the third port is closer to the first middle portion than is the fourth port and such that the fourth port is closer to the second end portion than is the third port;
   wherein the movable valve member includes:
   a third end portion and a fourth end portion opposite the third end portion, the third and fourth end portions in fluid communication respectively with the first inlet/outlet and the second inlet/outlet of the valve body;
   a second middle portion between the third and fourth end portions of the movable valve member;
   a fifth port between the third end portion and the second middle portion, the fifth port alignable with the second port of the valve body;
   a sixth port between the fourth end portion and the second middle portion, the sixth port alignable with the third port of the valve body;
   wherein the movable valve member is movable relative to the valve body between:
   a first position in which the movable valve member blocks and inhibits fluid flow through the second port and the fourth port and in which the sixth port of the movable valve member is aligned with the third port of the valve body, whereby fluid flow is permitted along a first or forward fluid flow path defined from the first inlet/outlet, out of the valve via the first port, into the valve via the aligned third and sixth ports, and out the second inlet/outlet; and
   a second position in which the movable valve member blocks and inhibits fluid flow through the third and first ports and in which the fifth port of the movable valve member is aligned with the second port of the valve body, whereby fluid flow is permitted along a second or reverse fluid flow path defined from the second inlet/outlet, out of the valve via the fourth port, into the valve via the aligned fifth and second ports, and out the first inlet/outlet.

2. The valve of claim 1, further comprising a flow rater including a metering orifice and configured to be removably engaged with the fourth end portion of the movable valve member.

3. The valve of claim 2, wherein:
   the flow rater is configured to be removably engaged with the fourth end portion of the movable valve member via a press fit engagement of the flow rater into the fourth end portion of the movable valve member; or
   the flow rater includes a threaded portion configured for threaded engagement within a threaded portion of the movable valve member.

4. The valve of claim 2, wherein:
   the flow rater is configured to limit fluid flow in a first or forward flow direction while permitting full fluid flow in a second or reverse flow direction; and/or the flow rater is configured to act as a fixed orifice for an outside coil in heat pump mode when the outside coil is the evaporator coil and to allow full flow in the opposite direction in air conditioning mode.

5. The valve of claim 1, wherein:
the valve comprises a shuttle valve including first and second interior chambers cooperatively defined by the valve body and the movable valve member, the first interior chamber in fluid communication with the first inlet/outlet defined by the first end portion of the valve body, the second interior chamber in fluid communication with the second inlet/outlet defined by the second end portion of the valve body;
the shuttle valve is configured such that:
pressurized fluid entering the first interior chamber via the first inlet/outlet is operable for pushing the movable valve member to slide away from the first inlet/outlet towards an opposite end of the first interior chamber and towards the first position; and
pressurized fluid entering the second interior chamber via the second inlet/outlet is operable for pushing the movable valve member to slide away from the second inlet/outlet towards an opposite end of the second interior chamber and towards the second position.

6. The valve of claim 1, wherein the valve body and the movable valve member are configured to define:
a first stop operable for inhibiting sliding of the movable valve member within the valve body beyond the first position in a direction towards the second end portion, and thereby align the sixth port of the movable valve member with the third port of the valve body; and
a second stop operable for inhibiting sliding of the movable valve member within the valve body beyond the second position in a direction towards the first end portion, and thereby align the fifth port of the movable valve member with the second port of the valve body.

7. The valve of claim 6, wherein:
the second middle portion of the movable valve member includes opposing first and second wall portions defining a recessed portion therebetween; and
the first middle portion of the valve body includes a crimped portion that inwardly protrudes into the recessed portion of the movable valve member;
whereby contact of the crimped portion of the valve body with the first wall portion of the movable valve member is operable as the first stop that inhibits sliding of the movable valve member within the valve body beyond the first position; and
whereby contact of the crimped portion of the valve body with the second wall portion of the movable valve member is operable as the second stop that inhibits sliding of the movable valve member within the valve body beyond the second position.

8. The valve of claim 1, wherein the movable valve member is slidably disposed within the valve body such that:
fluid flow into the first inlet/outlet applies pressure to the movable valve member for slidably moving the movable valve member away from the first inlet/outlet towards the first position; and
fluid flow into the second inlet/outlet applies pressure to the movable valve member for slidably moving the movable valve member away from the second inlet/outlet towards the second position.

9. The valve of claim 1, wherein:
the first port comprises a plurality of first ports spaced apart from each other along the valve body;
the second port comprises a plurality of second ports spaced apart from each other along the valve body;
the third port comprises a plurality of third ports spaced apart from each other along the valve body;
the fourth port comprises a plurality of fourth ports spaced apart from each other along the valve body;
the fifth port comprises a plurality of fifth ports spaced apart from each other along the movable valve member; and
the sixth port comprises a plurality of sixth ports spaced apart from each other along the movable valve member.

10. The valve of claim 1, wherein:
the valve body comprises a tubular cylindrical valve body including a wall defining the first, second, third, and fourth ports; and/or
the movable valve member comprises a cylindrical spool valve member.

11. A bi-flow filter drier comprising the valve of claim 1.

12. A bi-flow filter drier comprising the valve of claim 1 disposed along a centerline of the bi-flow filter drier.

13. A bi-flow filter drier comprising the valve of claim 1, wherein the valve includes a longitudinal centerline substantially aligned with a longitudinal centerline of the bi-flow filter drier.

14. A bi-flow filter drier comprising:
the valve of claim 1;
a housing including one or more walls defining an interior compartment;
one or more filtration mediums within the interior compartment; and
a desiccant within the interior compartment.

15. The bi-flow filter drier of claim 14, wherein:
the one or more walls of the housing comprise a single wall defining the interior compartment whereby the housing has a single-piece monolithic construction; and/or
the first and second end portions of the valve body protrude outwardly beyond the housing, whereby the first and second end portions are exposed and accessible for connecting the valve to a liquid line in a reversible refrigeration system.

16. A bi-flow filter drier comprising:
the valve of claim 1;
a housing including one or more walls defining an interior compartment;
a first porous element within the interior compartment of the housing and disposed along an outer surface the valve body such that the first porous element is disposed over the second and third ports of the valve body;
a desiccant within the interior compartment of the housing and disposed over the first porous element;
a second porous element within the interior compartment of the housing and disposed over the desiccant; and
a filter within the interior compartment of the housing and disposed over the second porous element.

17. The bi-flow filter drier of claim 16, wherein:
when the movable valve member is in the first position, a first or forward fluid flow path is defined from the first inlet/outlet of the valve body out through the first port of the valve body, through the filter, the second porous element, the desiccant, and the first porous element, into the valve body via the aligned third and sixth ports and out the second inlet/outlet; and
when the movable valve member is in the second position, a second or reverse fluid flow path is defined from the second inlet/outlet of the valve body out through the fourth port of the valve body, through the filter, the second porous element, the desiccant, and the first porous element, into the valve body via the aligned second and fifth ports, and out the first inlet/outlet.

\* \* \* \* \*